(12) United States Patent
Surazski

(10) Patent No.: US 7,574,473 B2
(45) Date of Patent: Aug. 11, 2009

(54) TECHNIQUES FOR PROVIDING A CONFERENCE WITH A VIRTUAL PARTICIPANT

(75) Inventor: Luke Surazski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 374 days.

(21) Appl. No.: 11/417,804

(22) Filed: May 3, 2006

(65) Prior Publication Data

US 2007/0260685 A1 Nov. 8, 2007

(51) Int. Cl.
*G06F 15/16* (2006.01)
(52) U.S. Cl. .................. 709/204; 709/225; 709/227; 709/228; 709/229
(58) Field of Classification Search .................. 709/204
See application file for complete search history.

(56) References Cited

U.S. PATENT DOCUMENTS

| | | | |
|---|---|---|---|
| 2004/0125933 A1* | 7/2004 | Jun et al. ............... | 379/202.01 |
| 2007/0124381 A1* | 5/2007 | Zurko ..................... | 709/205 |
| 2007/0172044 A1* | 7/2007 | Nguyen .................. | 379/202.01 |
| 2007/0208806 A1* | 9/2007 | Mordecai et al. ........... | 709/204 |
| 2007/0233785 A1* | 10/2007 | Abraham et al. ........... | 709/204 |

OTHER PUBLICATIONS

U.S. Appl. No. 11/099,957, filed Apr. 5, 2005, David Wesley Butt.
U.S. Appl. No. 11/260,057, filed Oct. 27, 2005, Martin Eppel, et al.
"Cisco, Microsoft to Collaborate on Communication Tools", http://www.entmag.com/news/article.asp?EditorialsID=7226; 3 pages.

* cited by examiner

*Primary Examiner*—Larry D Donaghue
*Assistant Examiner*—Nicholas Taylor
(74) *Attorney, Agent, or Firm*—Brian N. Young; Trellis IP Law Group, PC

(57) ABSTRACT

Techniques for conducting a meeting using a meeting management system are provided. A connection from a user to a connection interface is received for a meeting being offered by the meeting management system. An input is received that provides contact information for a user. The user may choose to be a virtual participant in the meeting. A meeting interface is provided during the meeting using the meeting management system where the interface includes an option to contact the user. The user is listed as a virtual participant in the meeting. A request to contact the user is received at the meeting interface and the user is automatically connected to the user using the contact information.

24 Claims, 7 Drawing Sheets

TECHNIQUES FOR PROVIDING A CONFERENCE WITH A VIRTUAL PARTICIPANT

BACKGROUND OF THE INVENTION

Embodiments of the present invention generally relate to conferencing and more specifically to techniques for contacting a virtual participant during a conference.

Video and telephone conferencing systems allow users to attend a meeting even if they are not physically able to be in a meeting room. This may allow users to attend more meetings. However, oftentimes, users are invited to attend a meeting but play a minimal role in the meeting. For example, they may be there just to answer questions if they come up or to give a brief status. These users may know ahead of time that their participation in the meeting may be limited. Thus, they know if they choose to attend the meeting they may be making poor use of their time.

If these users choose not to attend the meeting, then the actual participants in the meeting may need to go to some significant effort to find a missing user when an issue comes up that needs the missing user's input. Also, if the missing user is not able to be reached, then the issue may be skipped over and not even discussed. Thus, the meeting may become ineffective. When a missing user is needed, participants in the conference may attempt to out-dial the missing user at various numbers. For example, the missing user's telephone number may be looked up in a company directory. The number may then be called using a separate telephone or a different line than the one being used for the conference. It is inconvenient to do this and also, even if the missing user is contacted, the user will need to call/log in and connect to the meeting. This causes a disruption in the meeting and is often inconvenient. Also, even if the contact information is found in the directory, the missing user may not even be reachable at that number. For example, the missing user may be out of the office, on the road, in another meeting, etc.

DETAILED DESCRIPTION OF EMBODIMENTS OF THE INVENTION

Figure 1:
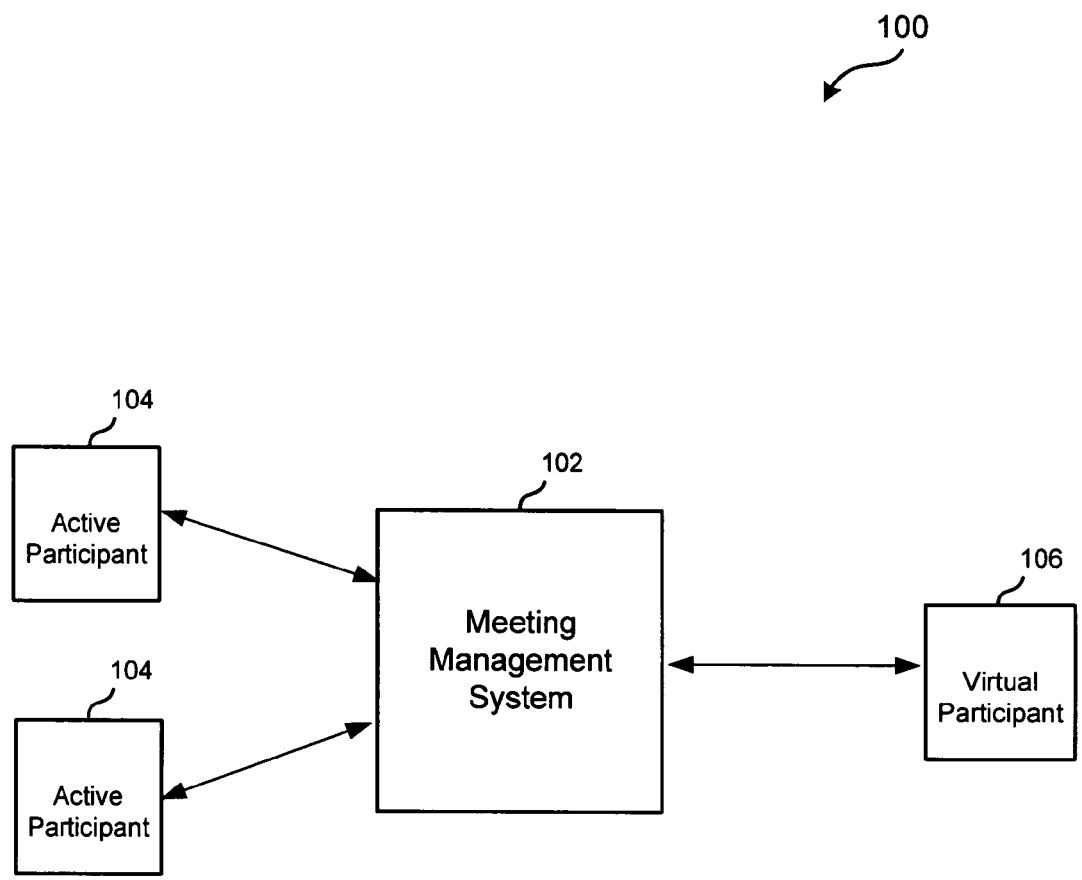
FIG. 1 depicts a system for providing a meeting management according to one embodiment on the present invention.

FIG. 1 depicts a system 100 for providing a meeting management according to one embodiment on the present invention. System 100 includes a meeting management system 102, active participants 104, and a virtual participant 106. It will be understood that any number of the components found in system 100 may be provided.

Meeting management system 102 is configured to provide a meeting. For example, system 102 provides a meeting in which one or more meeting participants may interact or meet. The meeting that may be conducted includes a video conference, telephone conference, web conference, instant messaging conference, etc. It will be recognized that meeting as used may be referred to as a conference or any other term that may be used for a gathering of users.

Meeting management system 102 allows a user/application to set up a meeting appointment, establish any necessary connections or data transfer among meeting participants, or otherwise generally facilitate interaction among meeting participants. When a live meeting is initiated, meeting management system 102 may provide the live meeting to all participants. Other features that meeting management system 102 can provide are described in U.S. patent application Ser. No. 11/099,957, entitled "AGENDA-BASED MEETING MANAGEMENT SYSTEM INTERFACE AND METHOD," filed Apr. 5, 2005, and U.S. patent application Ser. No. 11/260,057, entitled "METHOD AND SYSTEM FOR AUTOMATIC SCHEDULING OF A CONFERENCE," filed Oct. 27, 2005, all of which are hereby incorporated by reference for all purposes in its entirety.

In one embodiment, a meeting appointment or meeting environment may be set or conducted by a meeting program of meeting management system 102, computing system or other devices. The meeting program may, for example, provide but is not limited to one or more of conferencing, scheduling appointments, establishing telephone connections, remote presentations/education, or other meetings that may include remotely-located participants. Meeting management system 102 may be implemented, in whole or in part, in an independent or integrated manner with meeting, communications, or supporting applications or application data.

Active participants 104 are any participants that are actively connected to a meeting being provided by management system 102. Active participants 104 may be users using any devices to connect to meeting management system 102. For example, any computer, telephone, cellular phone, instant messaging client, etc. may be used by active participant 104 to connect to the meeting. When an active participant 104 is referred to as being connected to a meeting in the description, it is assumed that a user is using a device to connect to the meeting. The term "connecting" and variants thereof (e.g., "connection," "connect," "connected") and "contacting" and variants thereof (e.g., "contact", "contacts", etc.) as used in this application are intended to be construed broadly. For example, a connection can be achieved by any type of communication link, mode, signal type, protocol, format, etc., as desired. Any number and type of devices can be used to achieve one or more connections. Also, a user may be contacted through any connection.

Virtual participant 106 is a user that is not actively participating in the meeting but is available for contact during the meeting. As will be discussed in more detail below, virtual participant 106 may be automatically contacted when needed during the meeting. A virtual participant 106 may be selected from an interface and the virtual participant 106 is automatically connected to the meeting using meeting management system 102. When it is referred to as connecting to a virtual participant 106, the connection may be to contact information for a device of the virtual participant 106. For example, the user may be contacted at a cellular phone number, plain old telephone service (POTS) phone number, an email account, instant message identifier, etc. A person skilled in the art will appreciate techniques for connecting to a user. A user may be using any devices that can be used for any of the above contact information.

In one embodiment, an interface that is being used for the meeting initiates the automatic connection to a virtual participant 104. Thus, a separate application is not needed in order to automatically connect to virtual participant 106. Once the connection is made, the user may be automatically brought into the meeting. For example, a telephone call may be made to a telephone for the user and when connected, the user becomes a participant in the meeting through the telephone. This is convenient in that active participants 104 do not need to use separate applications to contact a virtual participant 106.

The methods of contacting virtual participant 106 are not restricted. For example, a virtual participant 106 may be contacted using a POTS network, a cellular telephone network, short message system (SMS), multi-media message system (MMS), instant messaging system, etc. Accordingly, users can make themselves available when they are on the road, such as in a doctor's office or in an airport, using any devices, such as a cellular phone, personal digital assistant, laptop computer connected to the Internet, etc. This frees a virtual participant 106 from using a certain device. For example, virtual participant 106 does not need to be at their desk and using a computer connected to the Internet. The methods of contacting a virtual participant 106 are flexible.

Figure 2:
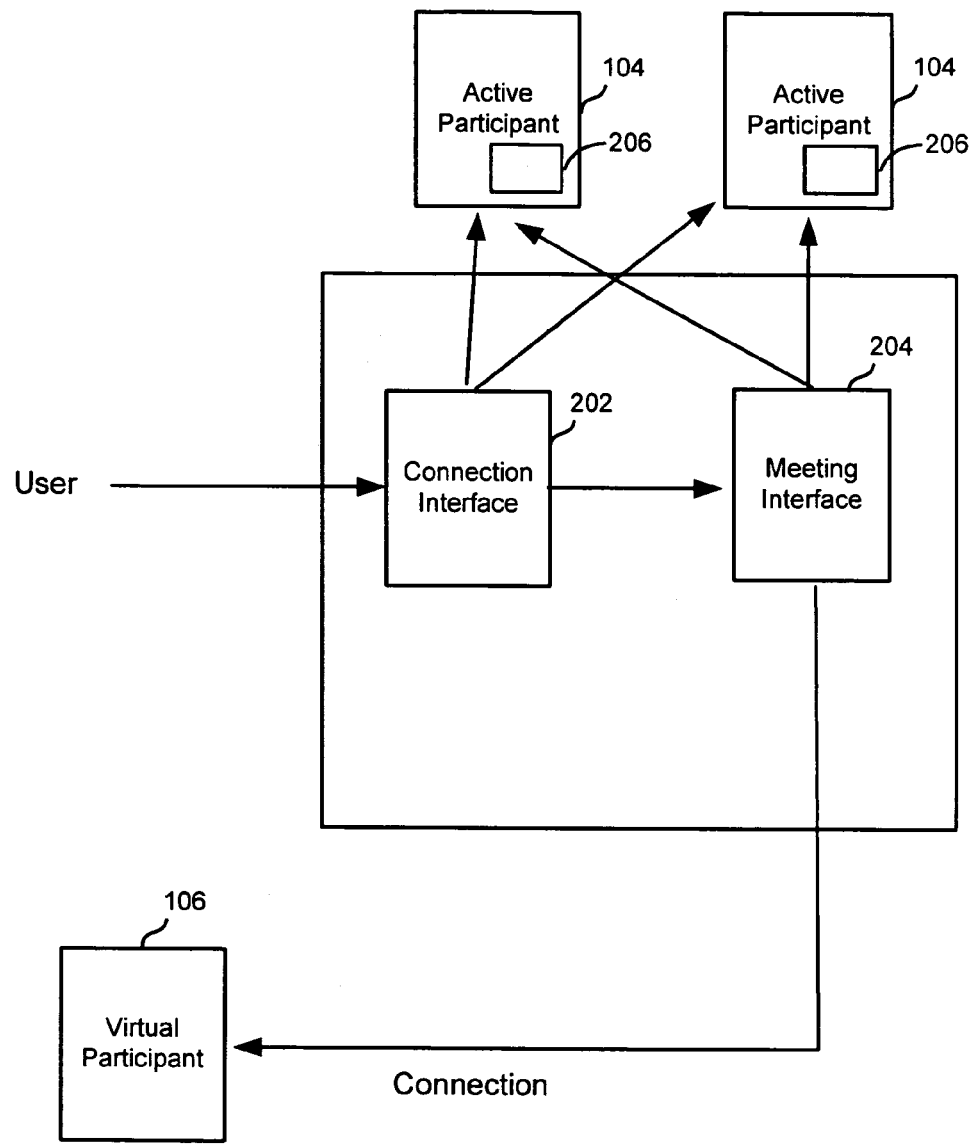
FIG. 2 depicts a more detailed block diagram of system according to one embodiment of the present invention.

FIG. 2 depicts a more detailed block diagram of system 100 according to one embodiment of the present invention. As shown, meeting management system 102 includes a connection interface module 202 and a meeting interface module 204. Connection interface module 202 provides an interface for users to enter into the meeting. For example, active participants 104 may connect to connection interface module 202 in order to attend the meeting. A person skilled in the art will appreciate how active participants 104 can attend a meeting using connection interface module 202. For example, an interactive voice-activated response (IVR) interface or a web interface may be used.

Virtual participant 106 may also connect to connection interface module 202. Virtual participant 106 may use the same interface that is used to join the meeting. During the process of joining the meeting, virtual participant 106 can indicate that he/she would like to be a virtual participant in a meeting. Virtual participant 106 may then enter contact information that can be used to contact the virtual participant 106. Also, meeting management system may determine contact information for the user. For example, an identifier for the user may be looked up and contact information for the user is determined. Also, a menu of possible devices to contact may be used where the user selects a device to contact.

In one embodiment, virtual participants 106 set their availability and contact information for a specific meeting. No other users, groups of users, meetings have access to the contact information for virtual participant 106. Thus, the contact information for virtual participant 106 does not persist when the meeting ends. Thus, virtual participants 106 may also have to enter into separate meetings individually and enter in contact information for both meetings.

During the meeting, active participants 104 may have an interface 206 for the meeting. For example, a web interface or telephone interface may be used. Interface 206 includes a list of participants that may include the active participants and the virtual participants of the meeting. Thus, even though virtual participant 106 is not actually connected to the meeting, virtual participant 106 is shown in the list of participants in the meeting. An identifier indicating virtual participant 106 is a virtual participant is shown to allow users to distinguish between active and virtual participants.

If a virtual participant 106 is required for any reason during the meeting, an identifier for the virtual participant 106 may be selected. The identifier may be any information for the virtual participant 106. For example, the identifier may be a name of the virtual participant, an icon, etc.

When the identifier is selected, meeting interface module 204 may automatically connect to the virtual participant 106 using the contact information previously entered in using connection interface module 202. For example, meeting interface module 204 may out-dial virtual participant 106 in order to pull them into the meeting. Also, any alerts may be sent to virtual participant 106. For example, a SMS text message may be sent requesting that the user call in to the meeting. Further, an instant message may be sent with a message or an SMS message with a slide that includes some information from which questions may be asked. Thus, a virtual participant 106 can be automatically contacted using interface 206.

Meeting interface module 204 can contact a virtual participant 106 through various networks. For example, virtual participants can be contacted through a POTS network, email network, cellular network, instant messaging network, etc. Virtual participant 106 may be able to select which network should be used when contact information is entered. For example, when a POTS phone number is entered, virtual participant 106 may indicate that the contact information is a POTS phone number and thus, meeting interface module 204 can contact the virtual participant 106 through the POTS network.

Also, virtual participant 106 does not need to be online. For example, virtual participant 106 does not need to be connected to the Internet to be contacted. This frees virtual participant 106 from having to be at a computer. Thus, virtual participant 106 may be available for a meeting even if virtual participant 106 is offline, such as when a virtual participant 106 is away from the office, in the car, at the airport, etc.

The process flow for registering for a meeting as a virtual participant and also for contacting a virtual participant will now be described in FIGS. 3 and 4.

Figure 3:
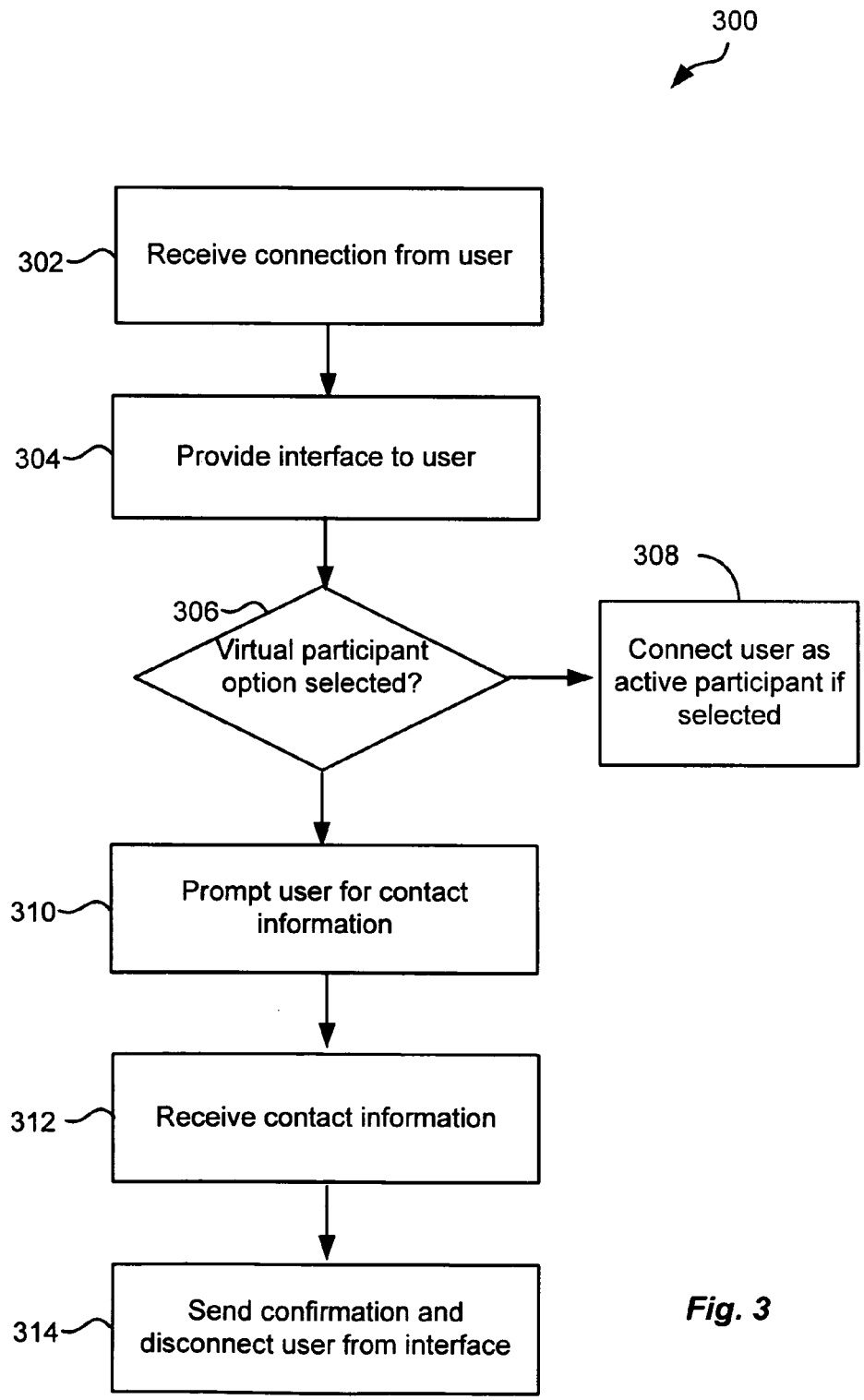
FIG. 3 depicts a simplified flow chart of a method for registering a virtual participant for a meeting according to one embodiment of the present invention.

FIG. 3 depicts a simplified flow chart 300 of a method for registering a virtual participant 106 for a meeting according to one embodiment of the present invention. In step 302, connection interface module 202 receives a connection from virtual participant. Virtual participant 106 may use any devices to connect to the meeting. For example, a user may call in using a telephone to connect to connection interface module 202. Also, the user may use a web interface to connect.

Connection interface module 202 provides an interface to the user in step 304. For example, virtual participant 106 may use an interactive voice response (IVR) system that allows the user to enter the meeting. The IVR may ask the user to press "1" to attend the meeting actively or to press some other key, such as "2", to attend the meeting virtually.

Step 306 determines if the user selected the virtual participant option. If the virtual participant option is not selected (i.e., the active participant option is selected), step 308 connects the user to the meeting as an active participant 104. A person skilled in the art will appreciate the steps taken to connect the user to the meeting.

If the user selects the virtual participant option, step 310 prompts the user for contact information. Step 312 receives the contact information from the user. The contact information may be any information that can be used to contact the user. Also, the user is not limited to entering the contact information for the device the user is currently using to register. For example, the user may be leaving the office and may want to be contacted on his/her cellular phone rather than the office phone.

Any methods may be used to enter the contact information. For example, if the IVR is being used, the user may enter a number using DTMF. Further, if a web interface is used, the user may provide the number through the web interface. The contact information may then be stored for later use during the meeting. In other embodiments, contact information may be determined automatically. For example, the user may have preferences set that indicate the user's cellular phone number should be contacted when the virtual participant option is selected.

Step 314 then sends a confirmation message to the user stating that their contact information was successfully received and they will be entered as a virtual participant in the meeting. The user is then disconnected from connection interface module 202. Thus, the user will not be actively connected to the meeting until needed.

Figure 4:
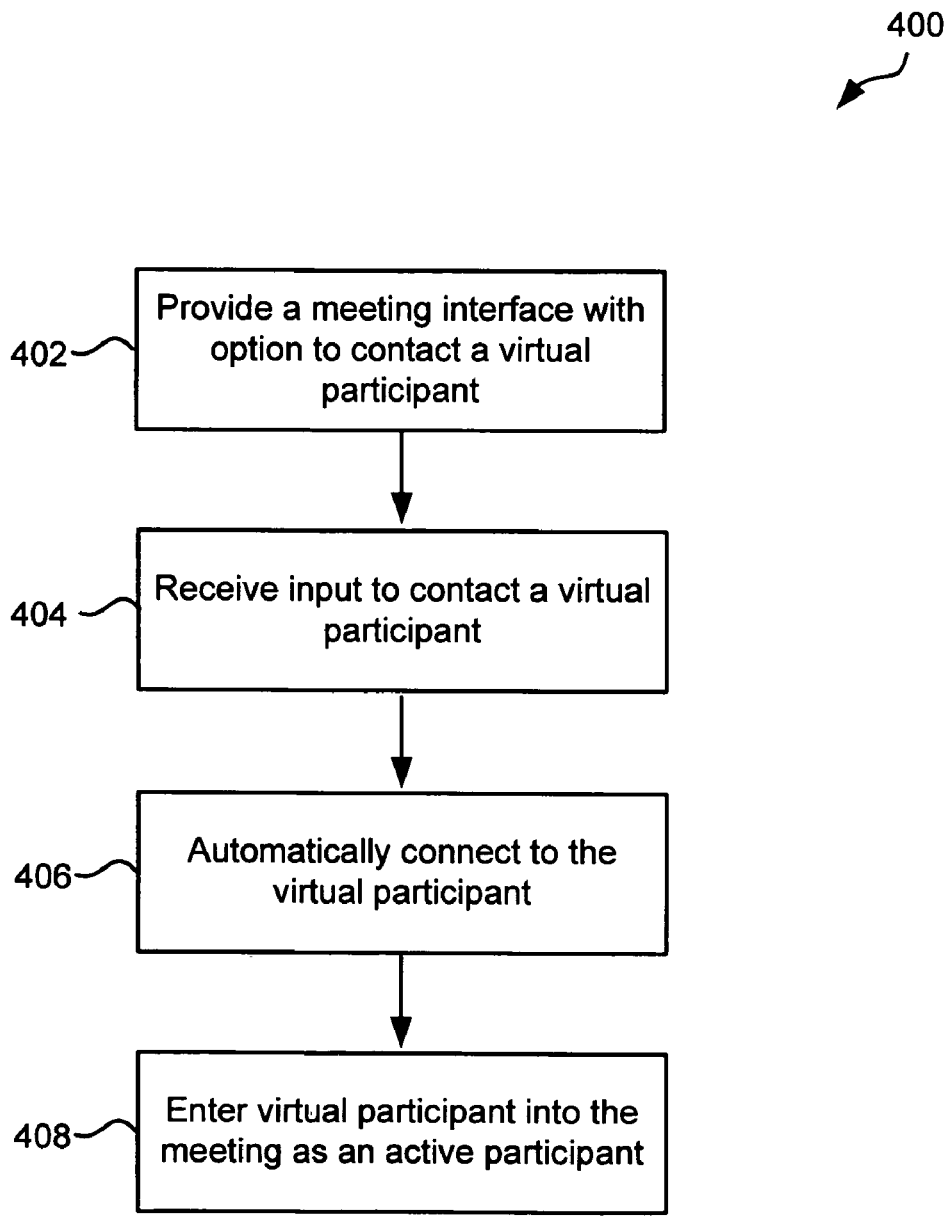
FIG. 4 depicts a simplified flowchart of a method for automatically connecting to a virtual participant during a meeting according to one embodiment of the present invention.

FIG. 4 depicts a simplified flowchart 400 of a method for automatically connecting to a virtual participant 106 during a meeting according to one embodiment of the present invention. Step 402 provides a meeting interface 206 with an option to contact a virtual participant 106 for the meeting. For example, an interface 206 may be provided to all active participants 104 in the meeting. Interface 206 may include a list of active participants in addition to the virtual participants. A virtual participant identifier may be provided next to the name of the virtual participant that identifies the name of the user as a virtual participant.

Step 404 receives an input to contact a virtual participant 106. For example, an active participant 104 may select the identifier for a user (e.g., an icon) using a web interface. Further, the virtual participant 106 identifier may also be selected using a menu on a telephone, through voice commands, etc.

Step 406 then automatically connects to virtual participant 106. Step 408 enters virtual participant 106 into the meeting as an active participant. In one embodiment, virtual participant 106 is prompted to see if they want to enter the meeting. For example, an interface may ask the virtual participant 106 to enter "1" to actively enter the meeting. In other embodiments, step 408 automatically enters the virtual participant 106 into the meeting. For example, once a user answers a call, the user is entered into the meeting as an active participant 104.

In one embodiment, participants in a meeting can transition from an active participant state to a virtual participant state, and vice versa. For example, an active participant 104 may want to become a virtual participant 106 during the meeting. Active participant 104 may then use an interface for the meeting to transition to the virtual participant state. The interface may allow active participant 104 to select the virtual participant option. Active participant 104 can then enter in contact information. Active participant 104 is then transitioned to a virtual participant 106 and can be contacted using the contact information. This may be useful when active participant 104 needs to do other things. For example, a user may need to make a phone call using the phone that is being used for the meeting. By becoming a virtual participant 106, the phone is disconnected from the meeting and thus can be used to make the phone call.

Also, virtual participant 106 may decide to become an active participant 104. In this case, virtual participant 106 may connect to the meeting as described above and the status can be changed to an active participant 104. Virtual participant 106 is then transitioned to an active participant.

Figure 5:
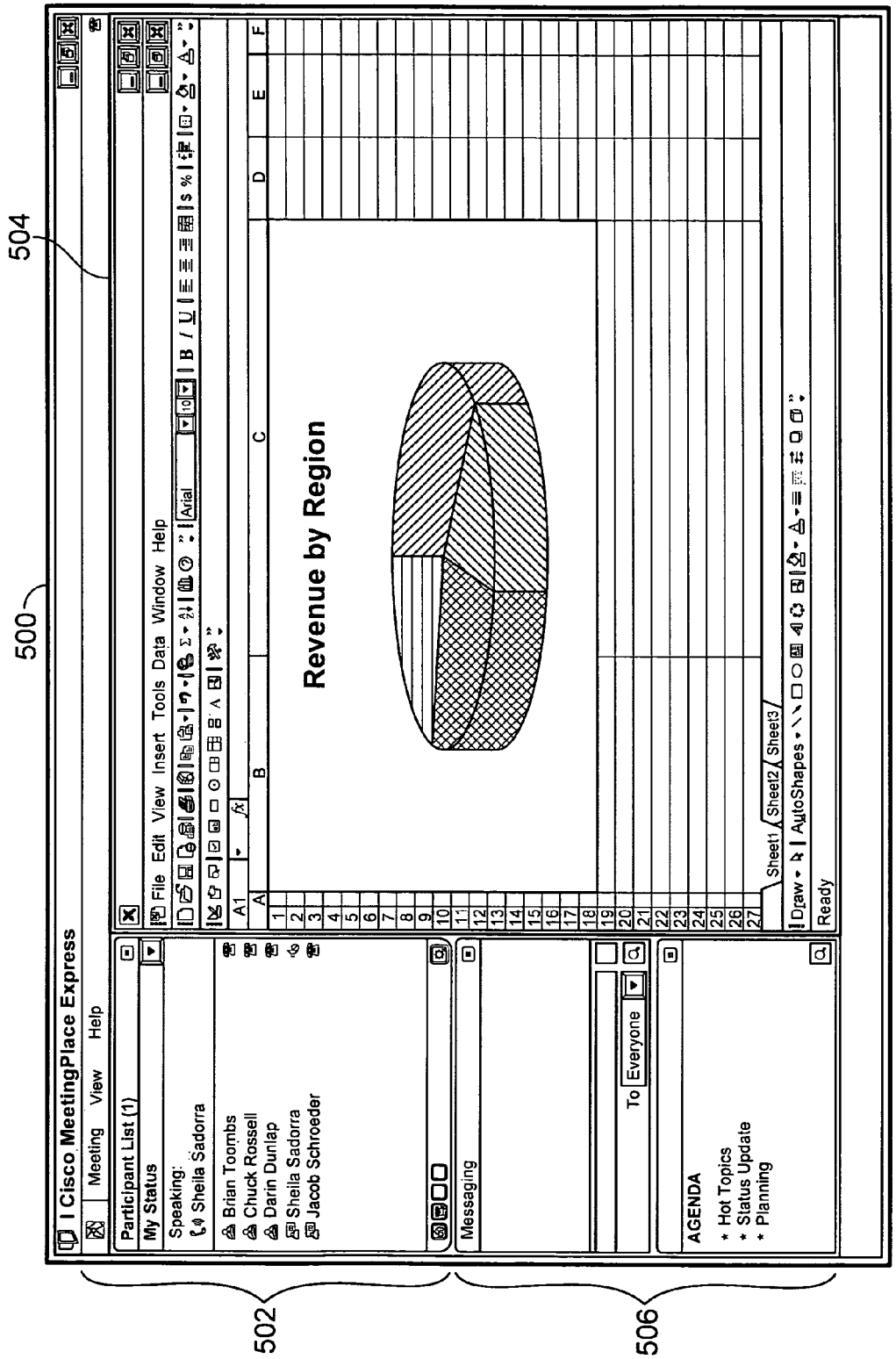
FIG. 5 depicts an interface that may be provided using embodiments of the present invention.

FIG. 5 depicts an interface 500 that may be provided using embodiments of the present invention. As shown, a meeting is being held using interface 500. A sharing document region 504 is provided for sharing documents with participants in the meeting. Also, other regions 506 provide other features for the meeting, such as an agenda may be posted or messaging may be provided.

Section 502 provides a list of the participants in the meeting. These participants include active participants 104 and virtual participants 106.

Figure 6:
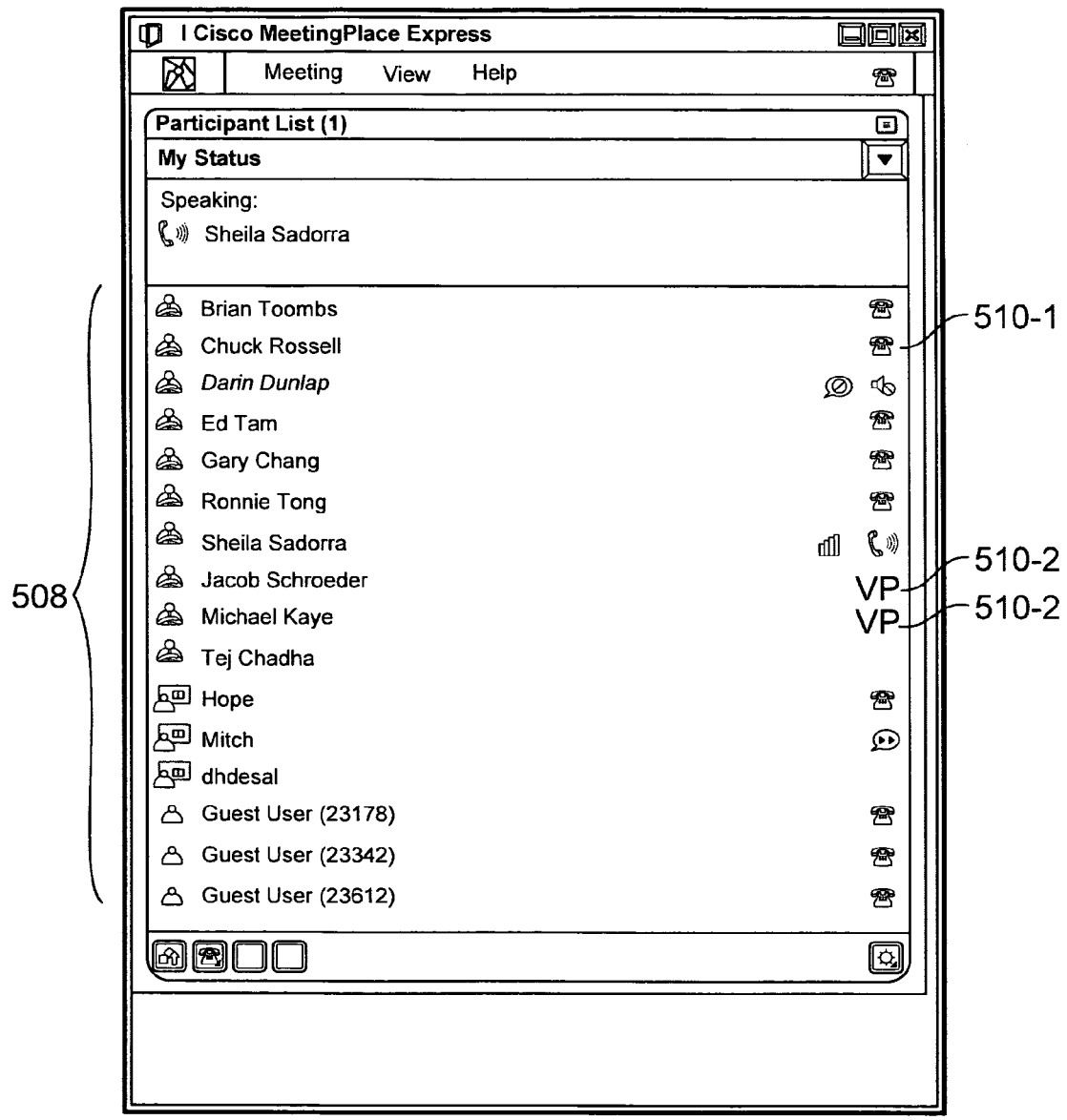
FIG. 6 depicts a view of a list according to one embodiment of the present invention.

Referring to FIG. 6, a more detailed view of section 502 is shown according to embodiments of the present invention. As shown, usernames 508 are provided for participants in the meeting. The usernames may be identifiers for a user, the given name, a screen name, a picture, etc.

Also, icons 510 are provided to show the status of the participants. For example, icon 510-1 shows that a user is connected to the meeting using the telephone. Further, an icon 510-2, "VP", shows that a participant is a virtual participant.

When a virtual participant 106 needs to be contacted, a user may select an identifier for virtual participant 106. For example, the icon 510, name 508, or an entry box, etc. may be selected. Additionally, other methods of selecting the virtual participant may be appreciated. The selection causes meeting interface module 204 to automatically connect to the virtual participant 106 using the contact information that was previously provided. Thus, a virtual participant 106 may be contacted using the interface being used for the meeting.

Figure 7:
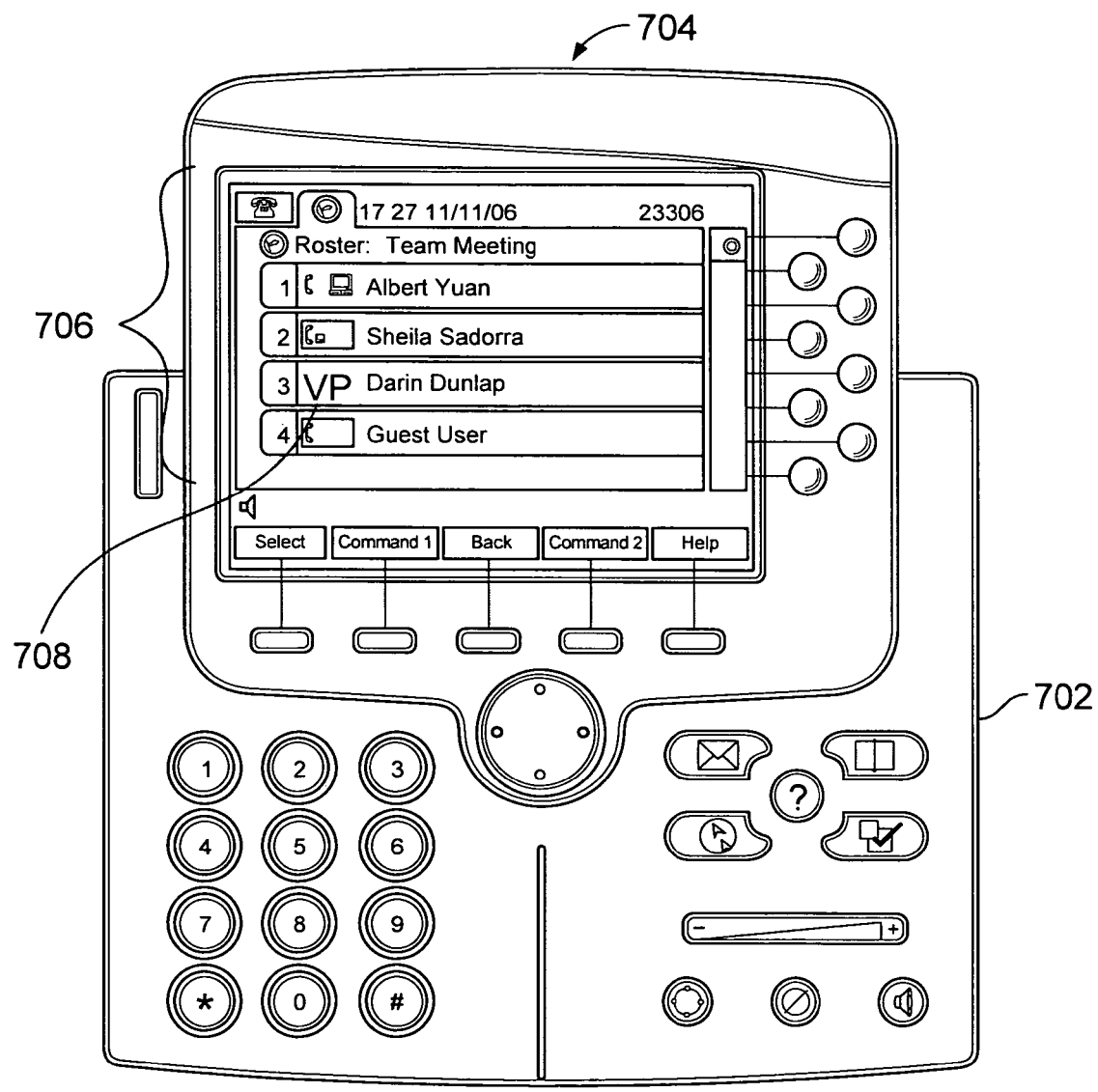
FIG. 7 depicts another embodiment of an interface according to embodiments of the present invention.

FIG. 7 depicts another embodiment of an interface according to embodiments of the present invention. As shown, a meeting is being provided using a telephone 702. Telephone 702 may be a telephone that is being used by an active participant 104 in a meeting.

Interface 704 shows a list of users 706 that are participating in the meeting. As described above, an icon 708 shows that a user is a virtual participant 106. For example, "Darin Dunlap" may be a virtual participant 106 in this meeting. When someone wants to contact Darin Dunlap, the entry for the user may be highlighted and selected using telephone 702. When the entry is selected, Darin Dunlap is automatically contacted using contact information that was previously provided. For example, the request may be sent to meeting interface module 204, which then automatically contacts Darin Dunlap using the contact information. In another embodiment, telephone 702 may automatically dial the contact information for Darin Dunlap.

Embodiments of the present invention may be used in many different scenarios. For example, a user that is out of the office may dial in to the meeting and enter in contact information as a virtual participant 106. The user may be driving with a cellular phone or be in the airport. When the user is in the airport, the user may not even need a cellular phone but may provide a pay-phone number that can be called. This user may not want to be in the conference at all times because they are either driving or they cannot stay on the pay-phone for the entire meeting. Thus, when the user is needed, the user is contacted using the contact information provided. Accordingly, the user may be connected through a cellular phone or a POTS phone.

Embodiments of the present invention provide many advantages. For example, users may make themselves available for a meeting when they are not able to attend or do not want to attend the whole meeting. A mechanism is provided that allows for the automatic connection to the user. This automatic connection may be a single selection from an interface, which can then automatically connect to a virtual participant. Also, the selection may be made in an interface that is being used by active participants in the meeting. Thus, separate applications may not be needed in order to connect to the virtual participant. For example, a separate directory or telephone may not be needed or another application separate from the application providing the meeting may not be needed.

Further, because of the flexibility of entering any contact information for the virtual participant, a virtual participant is not limited to where they need to be in order to be contacted. For example, a user does not need to be at his/her computer. Rather, a POTS telephone number or a cellular telephone number may be used.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A method for providing a meeting using a meeting management system, the method comprising:
   receiving a connection from a user to a connection interface for the meeting being offered by the meeting management system;
   receiving an input indicating a selection of a virtual participant option for the meeting, the virtual participant option indicating the user is not actively participating in the meeting but is available for contact during the meeting;
   determining contact information for the user, the contact information being entered by the user during the connection to the connection interface in response to selection of the virtual participant option, the contact information entered by the user being inaccessible by other meetings;
   disconnecting the user from the connection interface;
   providing a meeting interface during the meeting using the meeting management system, the interface including an option to contact the user, the user being listed as a virtual participant in the meeting and not being connected to the meeting management system when listed as the virtual participant;
   receiving a request to contact the user from the meeting interface; and
   automatically connecting to the user using the contact information associated with the user and the meeting.

2. The method of claim 1, wherein automatically connecting to the user comprises automatically connecting to a POTS telephone for the user.

3. The method of claim 1, wherein the user is automatically entered into the meeting upon the connection to the user.

4. The method of claim 1, wherein automatically connecting to the user comprises sending an alert to the user.

5. The method of claim 1, wherein the connection interface comprises an interactive voice response interface or a web-based interface.

6. The method of claim 1, wherein the meeting interface comprises a list of participants in the meeting, wherein the user is included in the list as the virtual participant.

7. The method of claim 6, wherein the user is identified using an identifier indicating that the user is the virtual participant in the meeting.

8. The method of claim 1, wherein the user is automatically connected to using the contact information in response to a single selection from the meeting interface.

9. The method of claim 1, wherein connecting to the user comprises connecting to the user while the user is offline.

10. The method of claim 1, wherein the contact information is only available for the meeting after being input.

11. A meeting management system for providing a meeting the system comprising:
    one or more processors; and
    logic encoded in one or more computer-readable storage media for execution by the one or more processors and when executed operable to:
    receive a connection from a user to a connection interface for the meeting;
    receive an input from a user selecting a virtual participant option for the meeting the virtual participant option indicating the user is not actively participating in the meeting but is available for contact during the meeting;
    determine contact information for the user for the meeting being offered by the meeting management system, the contact information being entered by the user during the connection to the connection interface in response to selection of the virtual participant option, the contact information entered by the user being inaccessible by other meetings;
    disconnect the user from the connection interface;
    list the user as a virtual participant in a meeting interface for the meeting being offered by the meeting management system, the interface including an option to contact the user, the user not being connected to the meeting management system when listed as the virtual participant; and
    receive a request to contact the user and automatically connect to the user using the contact information associated with the user and the meeting.

12. The meeting management system of claim 11, wherein the logic is operable to automatically connect to the user comprises automatically connecting to a POTS telephone for the user.

13. The meeting management system of claim 12, wherein the user is automatically entered into the meeting upon the connection to the user.

14. The meeting management system of claim 11, wherein the logic is operable to send an alert to the user to automatically connect.

15. The meeting management system of claim 11, wherein the input is received through an interactive voice response interface or a web-based interface.

16. The meeting management system of claim 11, further comprising logic to display a list of participants in the meeting, wherein the user is included in the list as the virtual participant.

17. The meeting management system of claim 16, wherein the user is identified using an identifier indicating the option to contact the user.

18. The meeting management system of claim 11, wherein the user is automatically connected to using the contact information in response to a single selection from the meeting interface.

19. The meeting management system of claim 11, wherein the logic is operable to connect to the user while the user is offline.

20. The meeting management system of claim 11, wherein the contact information is only available for the meeting after being input.

21. A method for providing a meeting using a meeting management system, the method comprising:

means for receiving a connection from a user to a connection interface for the meeting being offered by the meeting management system;

means for receiving an input indicating a selection of a virtual participant option for the meeting, the virtual participant option indicating the user is not actively participating in the meeting but is available for contact during the meeting;

means for determining contact information for the user, the contact information being entered by the user during the connection to the connection interface in response to selection of the virtual participant option, the contact information entered by the user being inaccessible by other meetings;

means for disconnecting the user from the connection interface;

means for providing a meeting interface during the meeting using the meeting management system, the interface including an option to contact the user, the user being listed as a virtual participant in the meeting and not being connected to the meeting management system when listed as the virtual participant;

means for receiving a request to contact the user from the meeting interface; and means for automatically connecting to the user using the contact information associated with the user and the meeting.

22. The method of claim 1, further comprising associating the contact information for the user and the meeting, wherein the contact information automatically does not persist at a point after the meeting ends.

23. The method of claim 1, wherein the contact information entered by the user is inaccessible by other users.

24. The meeting management system of claim 11, further comprising logic configured to associate the contact information for the user and the meeting, wherein the contact information automatically does not persist at a point after the meeting ends.

* * * * *